United States Patent
Lim et al.

(10) Patent No.: US 9,619,133 B2
(45) Date of Patent: Apr. 11, 2017

(54) METHOD AND SYSTEM FOR DISPLAYING CONTENTS SCROLLING AT HIGH SPEED AND SCROLL BAR

(71) Applicant: SK PLANET CO., LTD., Seoul (KR)

(72) Inventors: Sang Seok Lim, Yongin-si (KR); Eun Bok Lee, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 112 days.

(21) Appl. No.: 14/125,228

(22) PCT Filed: Jul. 29, 2013

(86) PCT No.: PCT/KR2013/006770
§ 371 (c)(1),
(2) Date: Dec. 10, 2013

(87) PCT Pub. No.: WO2014/058144
PCT Pub. Date: Apr. 17, 2014

(65) Prior Publication Data
US 2015/0212723 A1    Jul. 30, 2015

(30) Foreign Application Priority Data

Oct. 10, 2012  (KR) .................. 10-2012-0112153
Oct. 24, 2012  (KR) .................. 10-2012-0118347

(51) Int. Cl.
*G06F 3/0485*   (2013.01)
*G06F 3/14*     (2006.01)
(Continued)

(52) U.S. Cl.
CPC .......... *G06F 3/04855* (2013.01); *G06F 3/041* (2013.01); *G06F 3/048* (2013.01);
(Continued)

(58) Field of Classification Search
CPC ........ G06F 3/0485; G06F 3/0481; G09G 5/34
See application file for complete search history.

(56) References Cited

U.S. PATENT DOCUMENTS

| | | |
|---|---|---|
| 6,747,680 B1 | 6/2004 | Igarashi et al. |
| 2010/0095239 A1 | 4/2010 | McCommons et al. |

(Continued)

FOREIGN PATENT DOCUMENTS

| | | |
|---|---|---|
| CN | 102207820 A | 10/2011 |
| KR | 1020100090879 A | 8/2010 |

(Continued)

OTHER PUBLICATIONS

International Search Report mailed Nov. 5, 2013 for PCT/KR2013/006770.

(Continued)

*Primary Examiner* — David Choi
(74) *Attorney, Agent, or Firm* — Hauptman Ham, LLP

(57) ABSTRACT

A high-speed scroll contents display system includes: a web document providing apparatus, as a user terminal is connected, a web document created in a web description language to the connected user terminal; and the user terminal for receiving the web document from the web document providing apparatus, displaying the web document as a web page screen on a mobile browser, and performing, if movement of a touched state on the web page screen is sensed, a contents scroll in correspondence to a sensed moving direction, repeating an operation of performing a high-speed scroll on contents while reducing a speed according to an ease function in a flicking direction of a sensed flick, stopping movement of the screen for a predetermined time period, and moving again the screen reducing the speed according to the ease function when the predetermined time period is elapsed, until an end of the flick is sensed.

4 Claims, 11 Drawing Sheets

(51) Int. Cl.
*G06F 3/041* (2006.01)
*G06F 3/048* (2013.01)
*G06F 3/0481* (2013.01)
*G06F 3/0488* (2013.01)
*G09G 5/34* (2006.01)

(52) U.S. Cl.
CPC ........ *G06F 3/0481* (2013.01); *G06F 3/04883* (2013.01); *G06F 3/14* (2013.01); *G09G 5/34* (2013.01); *G09G 2340/0471* (2013.01); *G09G 2340/145* (2013.01); *G09G 2354/00* (2013.01); *G09G 2370/027* (2013.01)

(56) References Cited

U.S. PATENT DOCUMENTS

| | | | |
|---|---|---|---|
| 2010/0125786 A1 | 5/2010 | Ozawa et al. | |
| 2011/0214088 A1* | 9/2011 | Sandru | G09G 5/346 715/785 |
| 2011/0246942 A1* | 10/2011 | Misawa | G06F 3/04815 715/830 |
| 2011/0296351 A1* | 12/2011 | Ewing, Jr. | G06F 3/0346 715/841 |
| 2012/0266068 A1* | 10/2012 | Ryman | G06F 3/0485 715/719 |
| 2013/0326398 A1* | 12/2013 | Zuverink | G06F 3/048 715/784 |
| 2015/0212723 A1* | 7/2015 | Lim | G06F 3/14 715/760 |

FOREIGN PATENT DOCUMENTS

| | | |
|---|---|---|
| KR | 1020110020679 A | 3/2011 |
| KR | 1020110064277 A | 6/2011 |
| KR | 1020120036652 A | 4/2012 |
| KR | 1020120091783 A | 8/2012 |

OTHER PUBLICATIONS

Office Action dateded Feb. 22, 2017 from SIPO in connection with the counterpart Chinese Patent Application No. 201380002015.5, citing the above reference(s).

* cited by examiner

METHOD AND SYSTEM FOR DISPLAYING CONTENTS SCROLLING AT HIGH SPEED AND SCROLL BAR

CROSS REFERENCE TO RELATED APPLICATION

This application claims the priority of Korean Patent Application No. 10-2012-0112153, filed on Oct. 10, 2012 and No. 10-2012-0118347, filed on Oct. 24, 2012 in the KIPO (Korean Intellectual Property Office). Further, this application is the National Phase application of International Application No. PCT/KR2013/006770 filed Jul. 29, 2013, which designates the United States and was published in Korean.

TECHNICAL FIELD

The present invention relates to a method and system for displaying contents scrolling at a high speed in a portable terminal, and more specifically, to a high-speed scroll contents display method and system, in which when the contents are scrolled at a high speed, the contents can be confirmed even while multiple pages are moved on a screen.

In addition, the present invention relates to a web page scrollbar display system and method, which can mitigate generation of contents scroll reactions caused by output of a scrollbar on a mobile terminal i.e., a user terminal, having restricted performance.

BACKGROUND ART

Since a portable terminal should consider mobility and portability, allocation of a space for user interface is restricted, and, accordingly, the size of a display screen on the portable terminal is also restricted.

Accordingly, when an electronic document, a web page or the like is displayed on the portable terminal, it is general that the entire contents can be viewed by handling the screen to scroll up, down, left and right.

If a touch screen is applied to the portable terminal, a touch-and-drag method, a flicking method or the like using a user's finger or a touch pen can be used to handle scroll of the screen.

In the touch-and-drag method, the screen moves as much as a distance dragging the finger of a user or the like, and thus the user should rapidly perform continuous touch-and-drag handlings when the moving distance on the screen is long. On the other hand, in the case of the flicking method, the screen moves a considerably long distance at a time by calculating a touched direction and a moving speed of the finger of the user or the like.

Accordingly, since the screen is scrolled at a high speed when a web page is scrolled in a mobile browser, details of the contents is almost invisible while the screen is moved, and if a user desires to view details of the contents, the user should stop the screen by touching the screen, or the user have to wait until the scroll operation is finished.

Meanwhile, a scrollbar continuously moves if the position of the contents is changed when the user performs a scroll or a flick. FIG. 8 is a view showing movement of a scrollbar when a contents scroll is performed in a wireless web browser. Referring to FIG. 8, a scrollbar is output on a web page screen displayed by the wireless web browser, and, at this point, the scrollbar moves in a direction opposite to the moving direction of the contents, and the movement is performed in a rate the same as that of outputting a contents area on the screen. However, in a mobile terminal having restricted performance, since a time span for displaying the contents on the screen is decreased due to an operation of outputting the scrollbar, the scroll may not be performed smoothly.

DISCLOSURE OF INVENTION

Technical Problem

Therefore, the present invention has been made in view of the above problems, and it is an object of the present invention to provide a high-speed scroll contents display method and system, in which contents can be confirmed even while multiple pages are moved on a screen, by distinguishing a high-speed scroll from a general scroll in an operation of a user's finger or a mouse for performing a general scroll and, in the case of the high-speed scroll, repeating an operation of dividing the screen, moving the divided screens at the same time, showing a standstill screen as long as a user may recognize the contents, and moving again to a next screen.

Another object of the present invention is to provide a web page scrollbar display system and method for smoothly performing a contents scroll at a mobile terminal having restricted performance by reducing the load of outputting a scrollbar, which is accomplished by performing, if movement of a touched state on a web page screen including a scrollbar is sensed at the user terminal, the contents scroll in correspondence to a sensed moving direction, hiding, if touch separation is sensed for the movement of the touched state, the scrollbar at a moment of sensing the touch separation, and outputting, if an end of a flick is sensed while a high-speed scroll is performed on the contents in a flicking direction of the sensed flick, the scrollbar on the web page screen containing the contents scrolled until the time point of sensing the end of the flick.

Technical Solution

To accomplish the above objects, according to one aspect of the present invention, there is provided a high-speed scroll contents display system including: a web document providing apparatus for providing, as a user terminal is connected, a web document created in a web description language to the connected user terminal; and the user terminal for receiving the web document from the web document providing apparatus, displaying the web document as a web page screen on a mobile browser, and performing, if movement of a touched state on the web page screen is sensed, a contents scroll in correspondence to a sensed moving direction, particularly, repeating an operation of performing a high-speed scroll on contents while reducing a speed according to an ease function in a flicking direction of a sensed flick, stopping movement of the screen for a predetermined time period, and moving again the screen while reducing the speed according to the ease function when the predetermined time period is elapsed, until an end of the flick is sensed.

According to another aspect of the present invention, there is provided a high-speed scroll contents display system including: a user terminal for displaying a web page screen of contents and sensing movement of a touched state on the web page screen and an end of a flick for the movement of the touched state; and a web document providing apparatus for performing, if movement of the touched state on the web page screen is sensed at the user terminal, a contents scroll in correspondence to a sensed moving direction, particularly, repeating an operation of performing a high-speed scroll on the contents while reducing a speed according to an ease function in a flicking direction of a sensed flick, stopping movement of the screen for a predetermined time period, and moving again the screen while reducing the speed according to the ease function when the predetermined time period is elapsed, until an end of the flick is sensed.

According to still another aspect of the present invention, there is provided a user terminal including: a communication unit for receiving a web document created in a web description language from a web document providing apparatus; a display for displaying the received web document as a web page screen on a mobile browser or displaying an output result of a web application process; an input unit for sensing a touch movement on the web page screen; a video output memory for recording and reading information to be output on the display; a memory for storing data including an intermediate operation result according to a process of the web application process; and a processor for performing, if movement of a touched state on the web page screen is sensed, a contents scroll in correspondence to a sensed moving direction, particularly, repeating, when a high-speed scroll is performed on contents in a flicking direction of a sensed flick, an operation of dividing a contents screen, moving the divided contents screens at a same time, providing a standstill screen as long as a user may recognize the contents, and moving again to a next screen, until an end of the flick is sensed.

In addition, the processor may repeat an operation of performing a high-speed scroll on the contents while reducing a speed according to an ease function in the flicking direction of the sensed flick, stopping movement of the screen for a predetermined time period, and moving again the screen while reducing the speed according to the ease function when the predetermined time period is elapsed, until an end of the flick is sensed.

According to still another aspect of the present invention, there is provided a web document providing apparatus including: a communication unit for communicating with a user terminal; a contents providing unit for providing the user terminal with contents; a sensing signal reception unit for receiving, from a user terminal, a touch movement sensing signal according to sensing movement of a touched state on a web page screen of the contents, a touch separation sensing signal according to sensing separation for the movement of the touched state, and a flick sensing signal according to sensing a flick; a contents scroll performing unit for performing a contents scroll in correspondence to a moving direction of the touch movement sensing signal and performing a high-speed scroll on the contents in correspondence to a flicking direction of the flick sensing signal; and a controller for performing, if movement of a touched state on the web page screen is sensed from the user terminal, a contents scroll in correspondence to the sensed moving direction, particularly, repeating, when a high-speed scroll is performed on the contents in the flicking direction of the sensed flick, an operation of dividing a contents screen, moving the divided contents screens at a same time, providing a standstill screen as long as a user may recognize the contents, and moving again to a next screen, until an end of the flick is sensed.

In addition, the controller may repeat an operation of performing a high-speed scroll on the contents in the flicking direction of the sensed flick, stopping movement of the screen for a predetermined time period, and moving again the screen when the predetermined time period is elapsed, until an end of the flick is sensed.

In addition, the controller may repeat an operation of performing a high-speed scroll on the contents while reducing a speed according to an ease function in the flicking direction of the sensed flick, stopping movement of the screen for a predetermined time period, and moving again the screen while reducing the speed according to the ease function when the predetermined time period is elapsed, until an end of the flick is sensed.

According to still another aspect of the present invention, there is provided a high-speed scroll contents display method of a user terminal, the method including the steps of: (a) receiving a web document created in a web description language from a web document providing apparatus; (b) displaying the received web document as a web page screen on a mobile browser according to a web application process; (c) sensing a moving direction of the touched state on the web page screen; (d) performing a contents scroll in correspondence to the sensed moving direction, particularly, performing a high-speed scroll on a contents screen in a flicking direction of a sensed flick; and (e) repeating an operation of dividing the contents screen, moving the divided contents screens at a same time, providing a standstill screen as long as a user may recognize the contents, and moving again to a next screen, until an end of the flick is sensed.

In addition, the step (e) may repeat an operation of stopping movement of the screen for a predetermined time period as long as the user may recognize the contents and moving again the screen when the predetermined time period is elapsed, until an end of the flick is sensed.

In addition, the step (e) may repeat an operation of performing a high-speed scroll while reducing a speed according to an ease function, stopping movement of the screen for a predetermined time period, and moving again the screen while reducing the speed according to the ease function when the predetermined time period is elapsed, until an end of the flick is sensed.

According to still another aspect of the present invention, there is provided a high-speed scroll contents display method of a web document providing apparatus, the method including the steps of: (a) providing a user terminal with contents; (b) sensing movement of a touched state on a web page screen of the contents from the user terminal; (c) performing a contents scroll in correspondence to a sensed moving direction, particularly, performing a high-speed scroll on a contents screen in a flicking direction of a sensed flick; and (d) repeating an operation of dividing the contents screen, moving the divided contents screens at a same time, providing a standstill screen as long as a user may recognize the contents, and moving again to a next screen, until an end of the flick is sensed.

In addition, the step (d) may repeat an operation of performing a high-speed scroll, stopping movement of the screen for a predetermined time period, and moving again the screen when the predetermined time period is elapsed, until an end of the flick is sensed.

In addition, the step (d) may repeat an operation of performing a high-speed scroll while reducing a speed according to an ease function, stopping movement of the screen for a predetermined time period, and moving again the screen while reducing the speed according to the ease function when the predetermined time period is elapsed, until an end of the flick is sensed.

According to still another aspect of the present invention, there is provided a web page scrollbar display system including: a user terminal for displaying a web page screen and sensing movement of a touched state on the web page screen and touch separation for the movement of the touched state; and a web page providing server for performing, if movement of the touched state on the web page screen including a scrollbar is sensed at the user terminal, a contents scroll in correspondence to a sensed moving direction, hiding, if touch separation is sensed for the movement of the touched state, the scrollbar at a moment of sensing the touch separation, and outputting, if an end of a flick is sensed while a high-speed scroll is performed on the contents in a flicking direction of a sensed flick, the scrollbar on the web page screen containing the contents scrolled until a time point of sensing the end of the flick.

At this point, if the touch separation is sensed for the movement of the touched state, the web page providing server adjusts a scrollbar update speed so as to update the scrollbar at a speed lower than a contents update speed.

In addition, the web page providing server adjusts the scrollbar update speed by confirming a specification of the user terminal.

According to still another aspect of the present invention, there is provided a web page providing server including a sensing signal reception unit for receiving, from a user terminal, a touch movement sensing signal according to sensing movement of a touched state on a web page screen including a scrollbar, a touch separation sensing signal according to sensing separation for the movement of the touched state, and a flick sensing signal according to sensing a flick; a contents scroll performing unit for performing a contents scroll in correspondence to a moving direction of the touch movement sensing signal and performing a high-speed scroll on the contents in correspondence to a flicking direction of the flick sensing signal; and a scrollbar hide processing unit for hiding, if touch separation is sensed for the movement of the touched state, the scrollbar not to be output on the screen at a moment of sensing the touch separation and outputting the scrollbar on the web page screen containing the contents scrolled until a time point of sensing an end of the flick if the end of the flick is sensed.

At this point, the web page providing server further includes a scrollbar update speed controller for adjusting, if the touch separation is sensed for the movement of the touched state, a scrollbar update speed so as to update the scrollbar at a speed lower than a contents update speed, in which the scrollbar update speed controller outputs the scrollbar by jumping by a unit of a step.

According to still another aspect of the present invention, there is provided a method of displaying a scrollbar of a web page by a web page providing server, the method including the steps of: receiving, if movement of a touched state on the web page screen including the scrollbar is sensed at a user terminal, a touch movement sensing signal; performing a contents scroll in correspondence to a moving direction of the touch movement sensing signal and receiving, if touch separation is sensed for the movement of the touched state, a touch separation sensing signal; hiding the scrollbar from the web page screen at a moment of receiving the touch separation sensing signal; performing a high-speed scroll on contents in a flicking direction of a sensed flick at the user terminal; and outputting, if an end of the flick is sensed, the scrollbar on the web page screen containing the contents scrolled until a time point of sensing the end of the flick.

At this point, the step of performing a high-speed scroll performs a flick animation as the flick is sensed, and the step of outputting the scrollbar outputs the scrollbar at a final position when the flick animation is finished.

According to still another aspect of the present invention, there is provided a method of displaying a scrollbar of a web page by a web page providing server, the method including the steps of: receiving, if movement of a touched state on the web page screen including the scrollbar is sensed at a user terminal, a touch movement sensing signal; performing a contents scroll according to a contents update speed, in correspondence to a moving direction of the touch movement sensing signal; adjusting a scrollbar update speed to update the scrollbar at a speed lower than the contents update speed; and outputting a scrollbar created according to the adjusted scrollbar update speed on the web page screen.

At this point, the step of outputting the web page screen outputs the scrollbar by jumping by a unit of a step according to the adjusted scrollbar update speed.

According to still another aspect of the present invention, there is provided a recording medium capable of being read by an electronic apparatus and recording a web page scrollbar display method as a program in a web page providing server, the method including the steps of: receiving, if movement of a touched state on a web page screen including a scrollbar is sensed at a user terminal, a touch movement sensing signal; performing a contents scroll in correspondence to a moving direction of the touch movement sensing signal and receiving, if touch separation is sensed for the movement of the touched state, a touch separation sensing signal; hiding the scrollbar from the web page screen at a moment of receiving the touch separation sensing signal; performing a high-speed scroll on contents in a flicking direction of a sensed flick at the user terminal; and outputting, if an end of the flick is sensed, the scrollbar on the web page screen containing the contents scrolled until a time point of sensing the end of the flick.

According to still another aspect of the present invention, there is provided a recording medium capable of being read by an electronic apparatus and recording a web page scrollbar display method as a program in a web page providing server, the method including the steps of: receiving, if movement of a touched state on a web page screen including a scrollbar is sensed at a user terminal, a touch movement sensing signal; performing a contents scroll according to a contents update speed, in correspondence to a moving direction of the touch movement sensing signal; adjusting a scrollbar update speed to update the scrollbar at a speed lower than the contents update speed; and outputting a scrollbar created according to the adjusted scrollbar update speed on the web page screen.

Advantageous Effects

According to the present invention, a user terminal may scroll a web document rapidly.

In addition, according to the present invention, a web document providing apparatus capable of rapidly scrolling a web document can be realized.

In addition, according to the present invention, when web page contents are scrolled at a high speed, details of the contents can be confirmed even while multiple pages are moved on a screen, by repeating an operation of dividing the screen, moving the divided screens at the same time, showing a standstill screen as long as a user may recognize the contents, and moving again to a next screen.

In addition, according to the present invention, it is possible to provide a web page scrollbar display system and method, which can smoothly perform a contents scroll at a mobile terminal having restricted performance by reducing the load of outputting a scrollbar.

BRIEF DESCRIPTION OF THE DRAWINGS

An embodiment of a high-speed scroll contents display system according to the present invention is described with reference to FIG. 1.

An embodiment of a user terminal according to the present invention is described with reference to FIG. 2.

Figure 3:
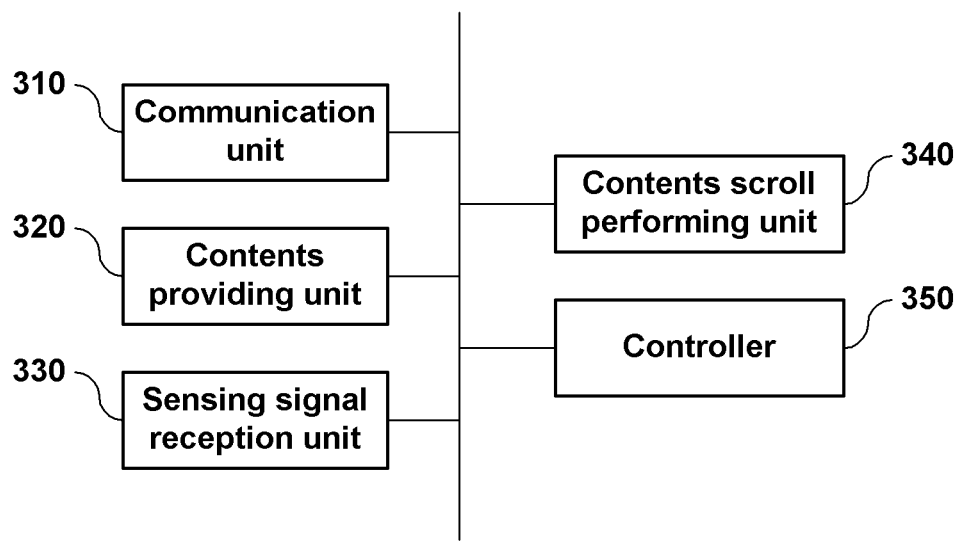

Another embodiment of a web document providing apparatus according to the present invention is described with reference to FIG. 3.

Figure 4:
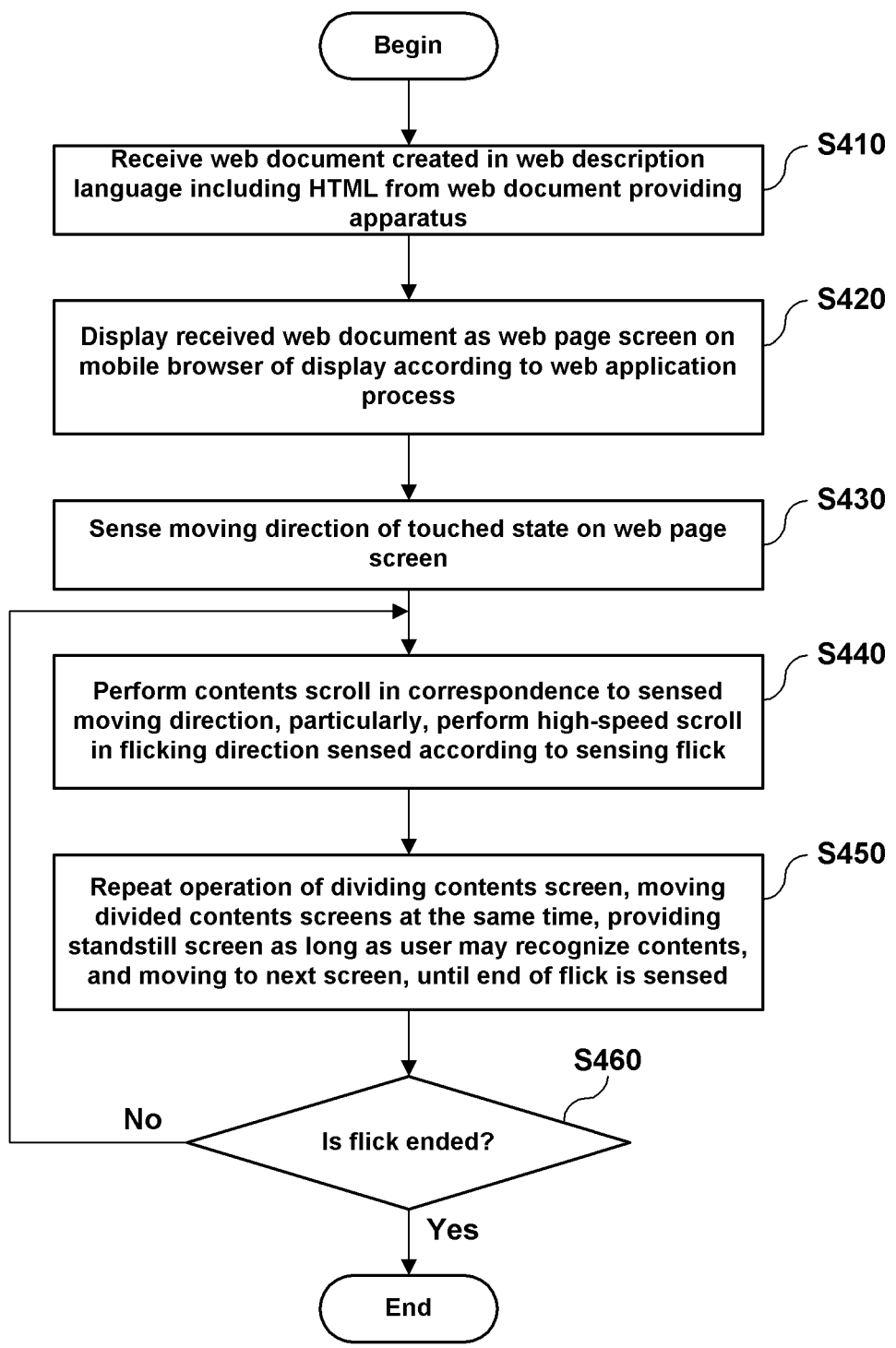

A high-speed scroll contents display method of a user terminal is described with reference to FIG. 4.

Figure 5:
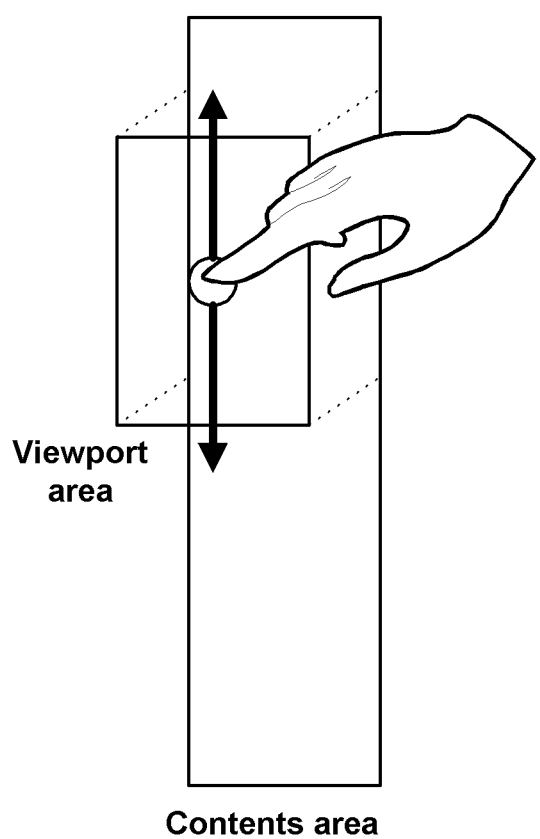

FIG. 5 is a view showing an example of sensing movement of a touched state on a web page screen of a view port on a mobile browser according to an embodiment of the present invention.

Figure 6:
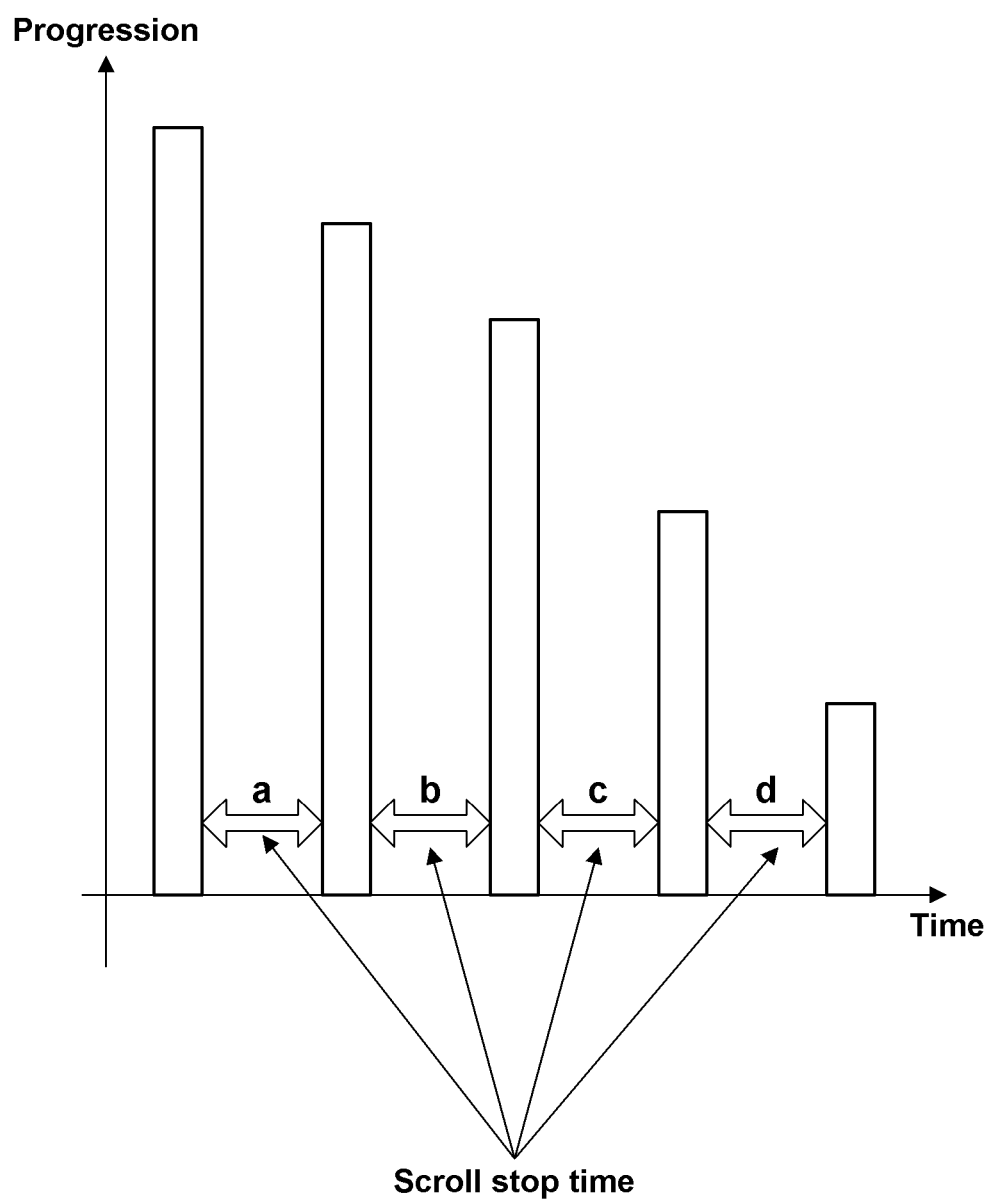

FIG. 6 is a view showing an example of repeating an operation of performing a high-speed scroll on a contents screen while reducing the speed, stopping movement of the screen for a predetermined time period, and moving again the screen while reducing the speed when the predetermined time period is elapsed until a flick is finished according to an embodiment of the present invention.

Figure 7:
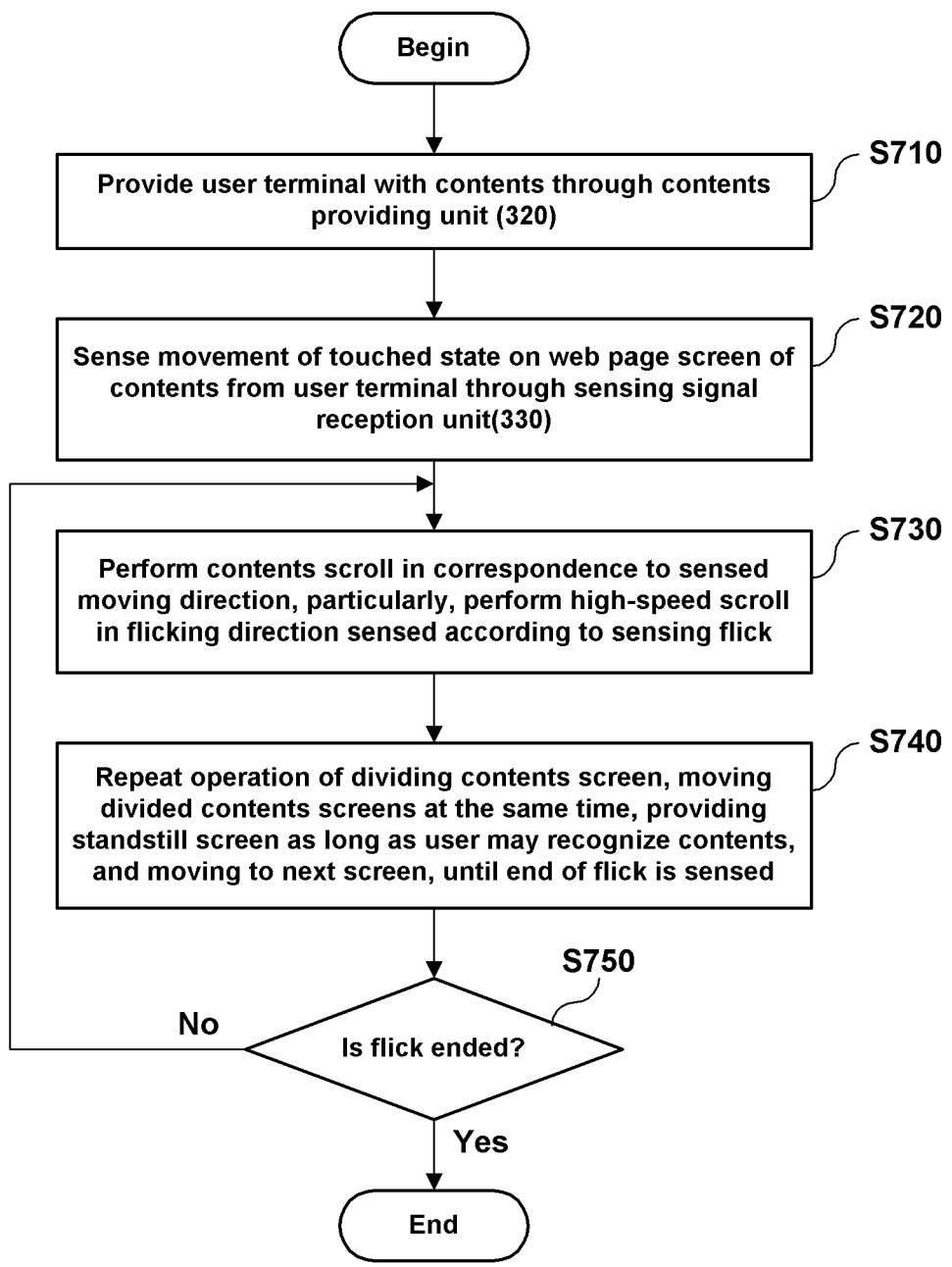

Another embodiment of a high-speed scroll contents display method of a web document providing apparatus according to the present invention is described with reference to FIG. 7.

Figure 8:
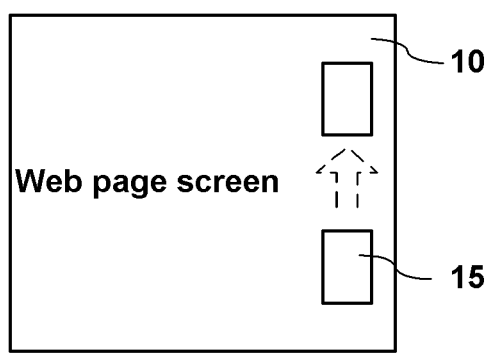

FIG. 8 is a view showing movement of a scrollbar when a contents scroll is performed in a wireless web browser.

Figure 9:
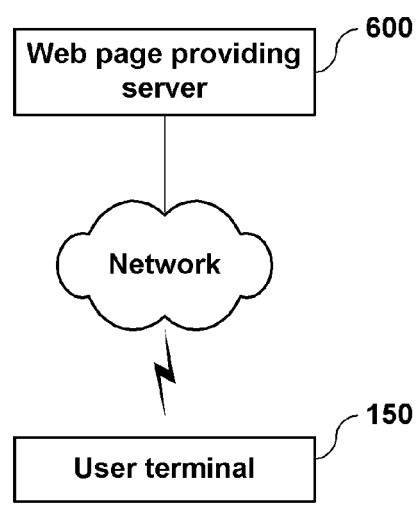

FIG. 9 is a view showing the configuration of a web page scrollbar display system according to an embodiment of the present invention.

Figure 10:
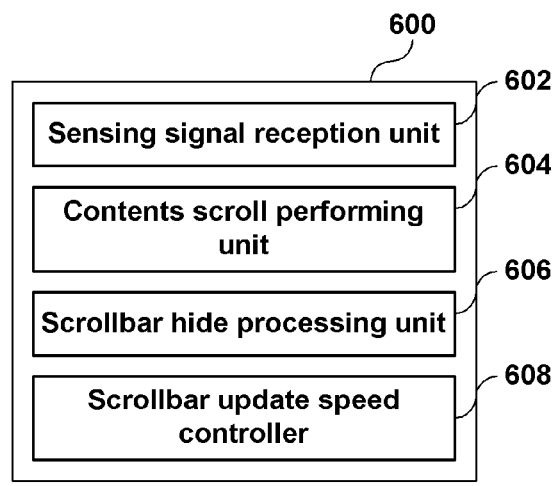

FIG. 10 is a view showing the internal configuration of a web page providing server according to an embodiment of the present invention.

Figure 11:
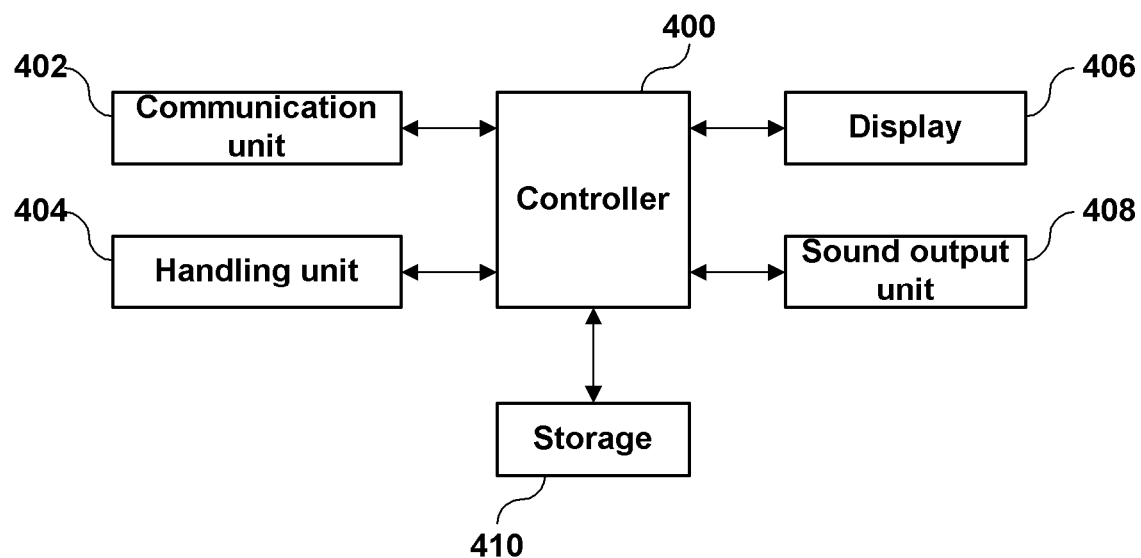

FIG. 11 is a view showing the internal configuration of a user terminal according to an embodiment of the present invention.

Figure 12:
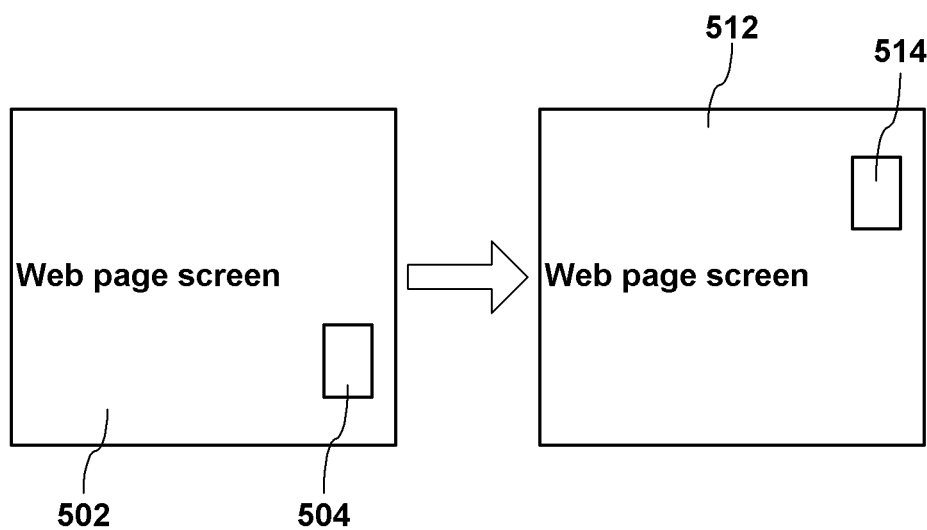

FIG. 12 is a view showing a web page screen according to an embodiment of the present invention.

Figure 13:
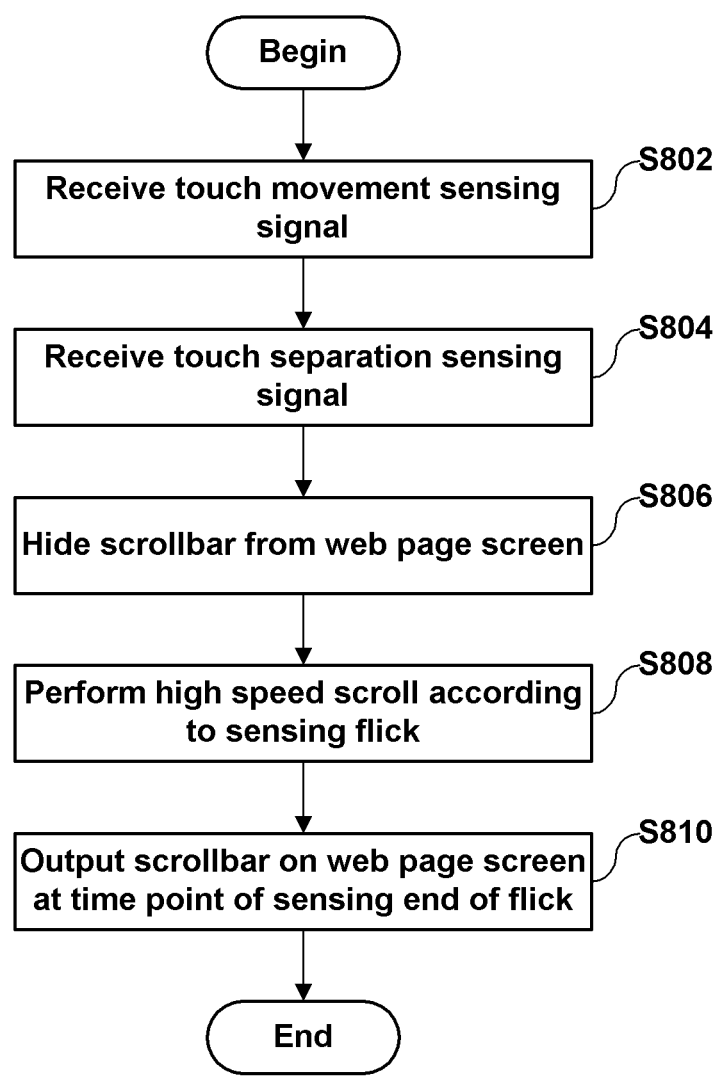

FIG. 13 is a flowchart illustrating a web page scrollbar display method according to a first embodiment of the present invention.

Figure 14:
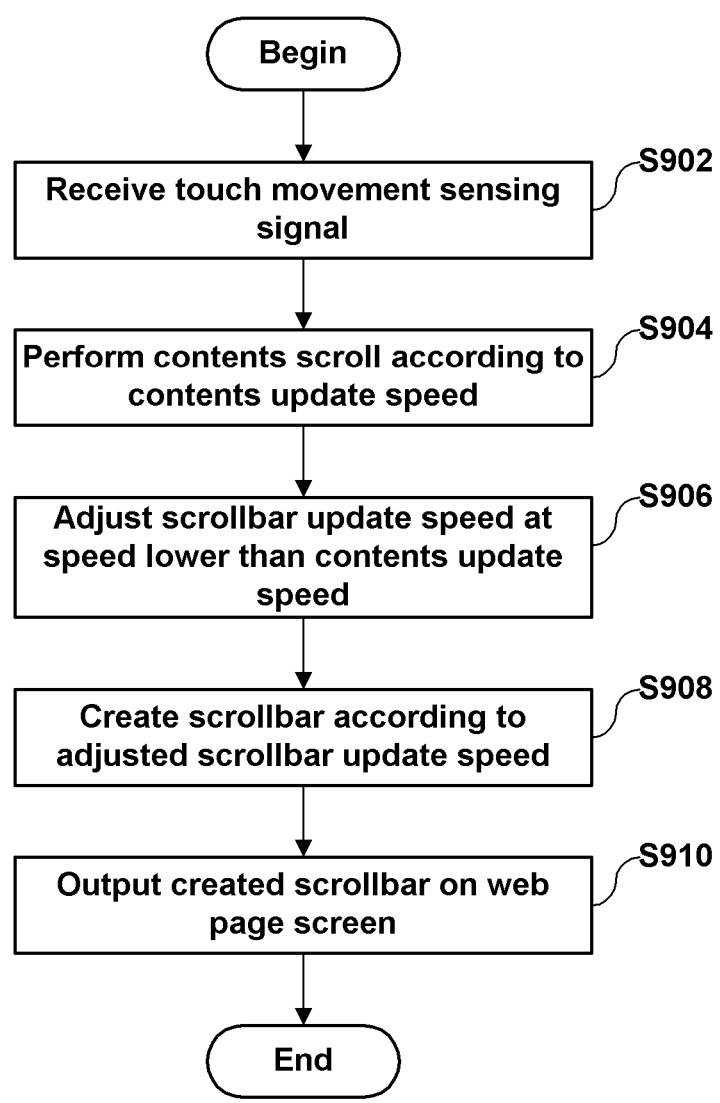

FIG. 14 is a flowchart illustrating a web page scrollbar display method according to a second embodiment of the present invention.

DESCRIPTION OF SYMBOLS

100: High-speed scroll contents display system  110: Web document providing apparatus
120, 130, 140, 150: User terminal  210: Communication unit
220: Display  230: Input unit
240: Video output memory  250: Memory
260: Processor  310: Communication unit
320: Contents providing unit  330: Sensing signal reception unit
340: Contents scroll performing unit  350: Controller
400: Controller  402: Communication unit
404: Handling unit  406: Display
408: Sound output unit  410: Storage
600: Web page providing server  602: Sensing signal reception unit

DESCRIPTION OF SYMBOLS -continued

604: Contents scroll performing unit hide processing unit  606: Scrollbar
608: Scrollbar update speed controller

BEST MODE FOR CARRYING OUT THE INVENTION

Since the present invention can make various modifications and have various embodiments, specific embodiments will be exemplified in the drawings and described in detail. However, this is not to limit to the specific embodiments of the present invention, but it should be understood that the specific embodiments are to cover all modifications, equivalents, and alternatives falling within the spirit and scope of the present invention.

Since those skilled in the art may implement various applications of the present invention through the embodiments in this specification, certain embodiments disclosed in the detailed descriptions of the present invention are merely examples for further clearly describing the present invention, and it is not intended to limit the scope of the present invention to the embodiments.

The functional units and means expressed in this specification are merely examples of implementing the present invention. Accordingly, other functional units or means may be implemented in other implementations of the present invention without departing from the spirit and scope of the present invention. In addition, although each of the functional units or means may be implemented only through a configuration of hardware or software, it can be implemented as a combination of various sorts of hardware and software executing the same function.

Embodiments of a high-speed scroll contents display method and system according to the present invention will be described in detail with reference to the accompanying drawings. In describing with reference to the accompanying drawings, elements having like or corresponding functions will be denoted by like reference numerals, and overlapped descriptions will be omitted.

In this specification, a user terminal is generally a device including at least one of a processor, a memory and a display. The user terminal includes a cellular phone, a tablet computer, a personal computer or the like.

In this specification, a web description language includes all the languages for creating a web document, such as Hyper Text Markup Language (HTML), Hyper Text Markup Language (HTML) 5, JavaScript, Cascading Style Sheets (CSS) and the like.

Figure 1:
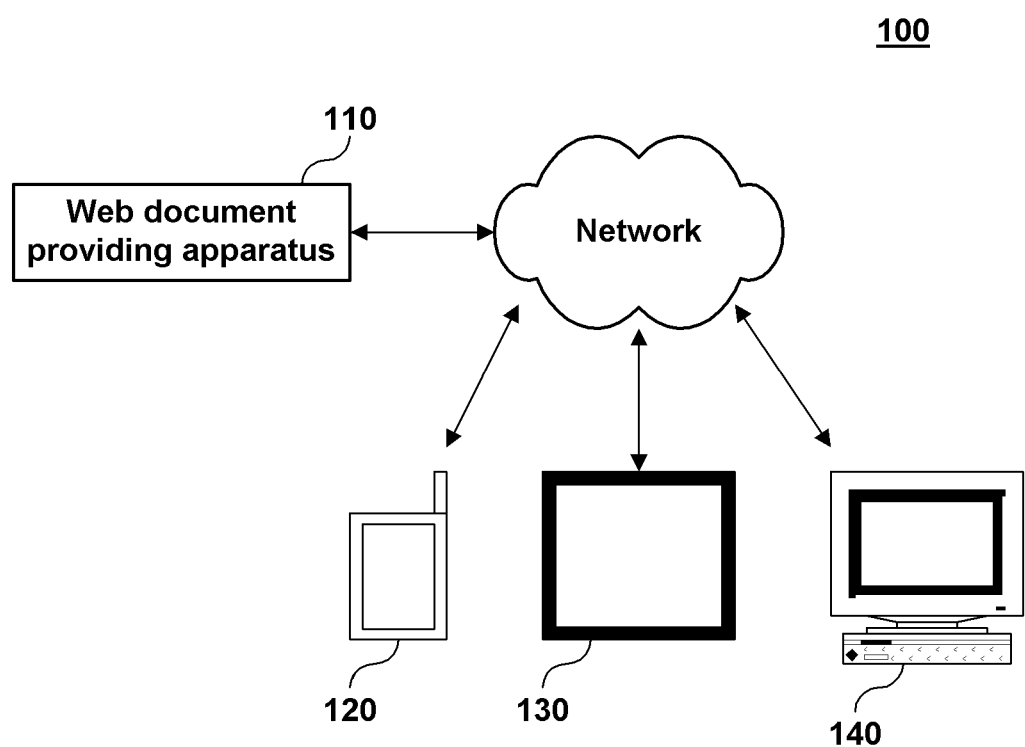

An embodiment of a high-speed scroll contents display system according to the present invention is described with reference to FIG. 1.

The high-speed scroll contents display system 100 according to an embodiment of the present invention includes a web document providing apparatus 110, a network, and a user terminal 120, 130 or 140.

The web document providing apparatus 110 is connected to a wired or wireless network and provides a web document created in a web description language to a user terminal connected through the wired or wireless network. The web document is created in a web description language including HTML and may be stored in a database connected to the web document providing apparatus.

The user terminal 120, 130 or 140 receives a web document from the web document providing apparatus, displays the web document as a web page screen on a mobile browser, and performs, if movement of a touched state on a web page screen is sensed, a contents scroll in correspondence to a sensed moving direction. Particularly, the user terminal repeats an operation of performing a high-speed scroll on the contents while reducing the speed according to an ease function in a flicking direction of a sensed flick, stopping movement of the screen for a predetermined time period, and moving again the screen while reducing the speed according to an ease function when the predetermined time period is elapsed, until an end of the flick is sensed.

Meanwhile, according to another embodiment of the present invention, the user terminal 120, 130 or 140 displays the web page screen of the contents provided by the web document providing apparatus 110 and senses and transmits movement of a touched state on the web page screen by the user and an end of a flick for the movement of the touched state to the web document providing apparatus 110.

Therefore, if movement of a touched state on the web page screen is sensed at the user terminal, the web document providing apparatus 110 performs a contents scroll in correspondence to a sensed moving direction, particularly, repeats an operation of performing a high-speed scroll on the contents while reducing the speed according to an ease function in a flicking direction of a sensed flick, stopping movement of the screen for a predetermined time period, and moving again the screen while reducing the speed according to an ease function when the predetermined time period is elapsed, until an end of the flick is sensed.

Figure 2:
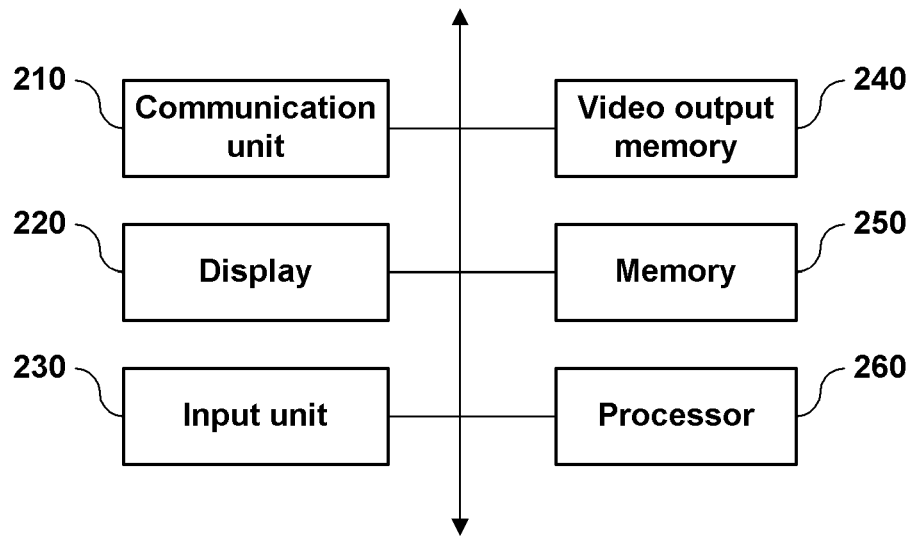

An embodiment of a user terminal according to the present invention is described with reference to FIG. 2.

The user terminal 120, 130 or 140 according to an embodiment of the present invention includes a communication unit 210, a display 220, an input unit 230, a video output memory 240, a memory 250, and a processor 260.

The communication unit 210 receives a web document created in a web description language from the web document providing apparatus.

The display 220 displays the received web document as a web page screen on a mobile browser or displays an output result of a web application process. The web application process generally refers to a process of an application capable of parsing a web document and outputting the parsed web document on a display means among application program processes executed in the processor 260, and a web browser is also included in the web application.

The input unit 230 senses a touch movement on the web page screen. Here, the display 220 and the input unit 230 may be implemented in the form of a touch interface.

The video output memory 240 is a memory providing a buffering function for recording and reading information to be output on the display 220.

The memory 250 stores data including an intermediate operation result according to a process of the web application process.

The processor 260 performs a contents scroll in correspondence to a sensed moving direction if movement of a touched state on the web page screen is sensed. Particularly, when a high-speed scroll is performed on the contents in a flicking direction of a sensed flick, the processor 260 repeats an operation of dividing the contents screen, moving the divided contents screens at the same time, providing a standstill screen as long as a user may recognize the contents, and moving again to a next screen, until an end of the flick is sensed.

Here, although the processor 260 may be a general-purpose central processing unit (CPU), it can be a programmable device element (CPLD or FPGA) or an application-specific integrated circuit (ASIC) implemented to be appropriate for a specific purpose.

In addition, the processor 260 may repeat an operation of performing a high-speed scroll on the contents in a flicking direction of a sensed flick, stopping movement of the screen for a predetermined time period, and moving again the screen when the predetermined time period is elapsed, until an end of the flick is sensed.

In addition, the processor 260 may repeat an operation of performing a high-speed scroll on the contents while reducing the speed according to ab ease function in a flicking direction of a sensed flick, stopping movement of the screen for a predetermined time period, and moving again the screen while reducing the speed according to an ease function when the predetermined time period is elapsed, until an end of the flick is sensed.

In addition, the processor 260 may repeat an operation of performing a high-speed scroll while reducing the speed according to an ease function, stopping movement of the screen for a predetermined time period of 100 to 300 ms, and moving again the screen while reducing the speed according to an ease function when the predetermined time period is elapsed, until an end of the flick is sensed.

In addition, when the contents are scrolled at a high speed in a flicking direction of a sensed flick, the processor 260 may finish the operation of the high-speed scroll when an end of the flick is sensed after passing through a plurality of time periods of stopping the scroll of the screen during the movement of the screen while reducing the speed based on an initial speed of the touch movement of the user.

In addition, when the user terminal processes and displays a scroll event using a graphic processing unit (GPU) as a constitutional component of the processor 260, a scroll using the GPU may perform an operation of Texture Upload for drawing a picture on the video buffer memory in order to render new contents that will be displayed in an area of the display 220 or in an area of a graphic user interface window.

Another embodiment of a web document providing apparatus according to the present invention is described with reference to FIG. 3.

The web document providing apparatus 110 according to another embodiment of the present invention includes a communication unit 310, a contents providing unit 320, a sensing signal reception unit 330, a contents scroll performing unit 340, and a controller 350.

The communication unit 310 performs communication with a user terminal through a network.

The contents providing unit 320 provides the user terminal with contents.

The sensing signal reception unit 330 receives, from the user terminal, a touch movement sensing signal according to sensing movement of a touched state on a web page screen of the contents, a touch separation sensing signal according to sensing separation for the movement of the touched state, and a flick sensing signal according to sensing a flick.

The contents scroll performing unit 340 performs a contents scroll in correspondence to a moving direction of the touch movement sensing signal and performs a high-speed scroll on the contents in correspondence to a flicking direction of the flick sensing signal.

If movement of a touched state on the web page screen is sensed from the user terminal, the controller 350 performs a contents scroll in correspondence to the sensed moving direction. Particularly, when a high-speed scroll is performed on the contents in a flicking direction of the sensed flick, the controller 350 repeats an operation of dividing the contents screen, moving the divided contents screens at the same time, providing a standstill screen as long as a user may recognize the contents, and moving again to a next screen, until an end of the flick is sensed.

In addition, the controller 350 may repeat an operation of performing a high-speed scroll on the contents in a flicking direction of a sensed flick, stopping movement of the screen for a predetermined time period, and moving again the screen when the predetermined time period is elapsed, until an end of the flick is sensed.

In addition, the controller 350 may repeat an operation of performing a high-speed scroll on the contents while reducing the speed according to an ease function in a flicking direction of a sensed flick, stopping movement of the screen for a predetermined time period, and moving again the screen while reducing the speed according to an ease function when the predetermined time period is elapsed, until an end of the flick is sensed.

In addition, the controller 350 may repeat an operation of performing a high-speed scroll on the contents while reducing the speed according to an ease function, stopping movement of the screen for a predetermined time period of 100 to 300 ms, and moving again the screen while reducing the speed according to an ease function when the predetermined time period is elapsed, until an end of the flick is sensed.

In addition, when the contents are scrolled at a high speed in a flicking direction of a sensed flick, the controller 350 may finish the operation of the high-speed scroll when an end of the flick is sensed after passing through a plurality of time periods of stopping the scroll of the screen during the movement of the screen while reducing the speed based on an initial speed of the touch movement of the user.

A high-speed scroll contents display method of a user terminal is described with reference to FIG. 4.

The processor 260 executes processes including a web application process and receives a web document created in a web description language including the Hyper Text Markup Language (HTML) from the web document providing apparatus 5410.

Subsequently, the processor 260 displays the received web document as a web page screen on a mobile browser of the display 220 according to a web application process 5420.

Accordingly, a user of the user terminal performs movement of the screen while touching a finger on the screen as shown in FIG. 5 in order to confirm details of the contents displayed on the web page screen of the mobile browser. FIG. 5 is a view showing an example of sensing movement of a touched state on a web page screen of a view port on a mobile browser according to an embodiment of the present invention.

Subsequently, the processor 260 senses a moving direction of the touched state on the web page screen as shown in FIG. 5 through the input unit 230 S430.

Subsequently, the processor 260 performs a contents scroll in correspondence to the sensed moving direction, particularly, performs a high-speed scroll on the contents screen in a flicking direction of a sensed flick 5440.

At this point, the processor 260 divides the contents screen, moves the divided contents screens at the same time, provides a standstill screen as long as a user may recognize the contents, and moves again to a next screen S450, and the processor 260 repeats this operation until an end of the flick is sensed S460.

Here, the processor 260 may repeat an operation of stopping movement of the screen for a predetermined time period as long as a user may recognize the contents and moving again the screen when the predetermined time period is elapsed, until an end of the flick is sensed.

That is, as shown in FIG. 6, the processor 260 may repeat an operation of performing a high-speed scroll while reducing the speed according to an ease function, stopping movement of the screen for a predetermined time period, for example, 100 to 300 ms, and moving again the screen while reducing the speed according to an ease function when the predetermined time period is elapsed, until an end of the flick is sensed. FIG. 6 is a view showing an example of repeating an operation of performing a high-speed scroll on a contents screen while reducing the speed according to an ease function, stopping movement of the screen for a predetermined time period, and moving again the screen while reducing the speed according to an ease function when the predetermined time period is elapsed until a flick is finished according to an embodiment of the present invention.

At this point, the processor 260 performs a high-speed scroll on the contents of the web page in a flicking direction of a sensed flick in order to finally move the screen to a target position, by finishing the operation of high-speed scroll when an end of the flick is sensed after passing through a plurality of time periods of stopping the scroll of the screen during the movement of the screen while reducing the speed in a variety of ease methods based on the speed at the moment of taking off the finger from the screen (the initial speed).

Accordingly, although a scroll is performed since the contents area of a web application is larger than the size of the display 220 or the size of a user interface window of the web application, the processor 260 may easily load a new data relevant to the display 200 or the user interface window of the web application on the video output memory 240 and display the data.

Another embodiment of a high-speed scroll contents display method of a web document providing apparatus according to the present invention is described with reference to FIG. 7.

The web document providing apparatus 110 provides a user terminal with contents through the contents providing unit 320 S710.

Subsequently, the web document providing apparatus 110 senses movement of a touched state on the web page screen of the contents as shown in FIG. 5 from the user terminal through the sensing signal reception unit 330 S720.

Subsequently, the web document providing apparatus 110 performs a contents scroll in correspondence to a sensed moving direction, particularly, performs a high-speed scroll on the contents screen in a flicking direction of a sensed flick 5730.

Subsequently, the web document providing apparatus 110 divides the contents screen, moves the divided contents screens at the same time, provides a standstill screen as long as a user may recognize the contents as shown in FIG. 6, and moves to a next screen S740, and the web document providing apparatus 110 repeats this operation until an end of the flick is sensed S750.

That is, the web document providing apparatus 110 may repeat an operation of performing a high-speed scroll of dividing the contents screen and moving the divided contents screens at the same time while reducing the speed according to an ease function, stopping movement of the screens for a predetermined time period, for example, 100 to 300 ms, and moving again the screen while reducing the speed according to an ease function when the predetermined time period is elapsed, until an end of the flick is sensed.

At this point, the web document providing apparatus 110 performs a high-speed scroll on the contents of the web page in a flicking direction of a sensed flick of a user from the user terminal in order to finally move the screen to a target position, by finishing the operation of the high-speed scroll when an end of the flick is sensed after passing through a plurality of time periods of stopping the scroll of the screen during the movement of the screen while reducing the speed in a variety of ease methods as shown in FIG. 6 based on the speed at the moment of taking off the finger from the screen (the initial speed).

According to the present invention described above, it is possible to implement a high-speed scroll contents display method and system, in which contents can be confirmed even while multiple pages are moved on a screen, by distinguishing a high-speed scroll from a general scroll in an operation of a user's finger or a mouse for performing a general scroll and, in the case of the high-speed scroll, repeating an operation of dividing the screen, moving the divided screens at the same time, showing a standstill screen as long as a user may recognize the contents, and moving again to a next screen.

FIG. 9 is a view showing the configuration of a web page scrollbar display system according to an embodiment of the present invention.

Referring to FIG. 9, the web page scrollbar display system according to an embodiment of the present invention includes a user terminal 150 and a web page providing server 600.

The user terminal 150 displays a web page screen in association with the web page providing server 600 and may transmit corresponding information to the web page providing server 600 if it senses movement of a touched state on the web page screen and touch separation for the movement of the touched state on the web page screen according to handling of a user.

In addition, the web page providing server 600 performs, if movement of the touched state on the web page screen including a scrollbar is sensed at the user terminal 150, a contents scroll in correspondence to a sensed moving direction, hides, if touch separation is sensed for the movement of the touched state, the scrollbar at the moment of sensing the touch separation, and outputs, if an end of a flick is sensed while a high-speed scroll is performed on the contents in a flicking direction of the sensed flick, the scrollbar on the web page screen containing the contents scrolled until the time point of sensing the end of the flick.

That is, it is a method of hiding a scrollbar at a moment of outputting contents on the screen at a high speed. Since the user can confirm that the scrollbar is output at the moment when the user touches a finger on the user terminal or an animation is finished, a current position in the entire contents can be easily grasped while reducing the load of outputting the scrollbar.

Meanwhile, if touch separation is sensed for the movement of the touched state, the web page providing server 600 may adjust a scrollbar update speed so as to update the scrollbar at a speed lower than a contents update speed.

In addition, the web page providing server 600 may adjust the scrollbar update speed by confirming the specification of the user terminal 150.

FIG. 10 is a view showing the internal configuration of a web page providing server according to an embodiment of the present invention.

Referring to FIG. 10, the web page providing server 600 according to the present invention includes a sensing signal reception unit 602, a contents scroll performing unit 604, a scrollbar hide processing unit 606, and a scrollbar update speed controller 608.

The sensing signal reception unit 602 may receive, from a user terminal, a touch movement sensing signal according to sensing movement of a touched state on a web page screen including a scrollbar, a touch separation sensing signal according to sensing separation for the movement of the touched state, and a flick sensing signal according to sensing a flick.

The contents scroll performing unit 604 may perform a contents scroll in correspondence to a moving direction of the touch movement sensing signal and perform a high-speed scroll on the contents in correspondence to a flicking direction of the flick sensing signal.

If touch separation is sensed for the movement of the touched state, the scrollbar hide processing unit 606 may hide the scrollbar not to be output on the screen at the moment of sensing the touch separation, and if an end of the flick is sensed, the scrollbar hide processing unit 606 may output the scrollbar on the web page screen containing the contents scrolled until the time point of sensing the end of the flick.

If touch separation is sensed for the movement of the touched state, the scrollbar update speed controller 608 may adjust a scrollbar update speed so as to update the scrollbar at a speed lower than a contents update speed. At this point, the scrollbar update speed controller 608 may output the scrollbar by jumping by the unit of a step.

FIG. 11 is a view showing the internal configuration of a user terminal according to an embodiment of the present invention, and FIG. 12 is a view showing a web page screen according to an embodiment of the present invention.

Referring to FIG. 11, the user terminal 150 according to an embodiment of the present invention may include a communication unit 402, a handling unit 404, a display 406, a sound output unit 408, a storage 410 and a controller 400.

The communication unit 402 may include a mobile communication module, a wireless Internet module, a near field communication module and the like, and the mobile communication module transmits and receives wireless signals of a base station on a mobile communication network, the wireless Internet module is a module for wireless Internet connection, and the near field communication module is a module for near field communication. At this point, the communication unit 402 may connect to the web page providing server 200 through the wireless Internet module.

The handling unit 404 creates an input data according to handling of a user for controlling an operation. The handling unit may be configured of a keypad, a dome switch, a touch pad or the like. Particularly, the touch pad may be implemented in a touch screen configuring a layered structure together with the display.

The display 406 may output information processed by the user terminal 150 on the screen and further include a touch sensing module to receive a handling signal according to handling of the user. That is, the display 406 displays a web page screen and may sense movement of a touched state on the web page screen and touch separation for the touched state according to handling of the user.

The sound output unit 408 may output a voice signal received through the communication unit in a communication mode or the like or audio data stored in the storage.

The storage 410 may store a program for implementing the process and control of the controller 400 and temporarily store input or output data.

The controller 400 generally controls the overall operation of the user terminal by controlling each part of the user terminal.

In addition, if movement of a touched state on the web page screen or touch separation for the touched state is sensed, the controller 400 may control to transmit corresponding information to the web page providing server.

In addition, the controller 400 may hide the scrollbar at the moment of sensing the touch separation and output, if an end of a flick is sensed while a high-speed scroll is performed on the contents in a flicking direction of the sensed flick, the scrollbar on the web page screen containing the contents scrolled until the time point of sensing the end of the flick, in association with the web page providing server.

For example, as shown in FIG. 12, initially, the user terminal 150 displays a first web page screen 502 including a scrollbar 504 outputted at the lower portion, and if a downward touch movement of the user for selecting a lower part of the contents is sensed, the user terminal 150 hides and does not output the scrollbar, and if an end of a flick is sensed, the user terminal 150 may display a second web page screen 512 including a scrollbar 514 outputted at the upper portion.

FIG. 13 is a flowchart illustrating a web page scrollbar display method according to a first embodiment of the present invention.

Referring to FIG. 13, if movement of a touched state on the web page screen including a scrollbar is sensed at the user terminal, the web page providing server according to the present invention receives a touch movement sensing signal S802.

In addition, the web page providing server performs a contents scroll in correspondence to a moving direction of the touch movement sensing signal, and if touch separation is sensed for the movement of the touched state, the web page providing server receives a touch separation sensing signal S804.

Accordingly, the web page providing server hides the scrollbar from the web page screen at the moment of receiving the touch separation sensing signal S806.

In addition, the web page providing server performs a high-speed scroll on the contents in a flicking direction of a sensed flick at the user terminal 150 S808, and if an end of the flick is sensed, the web page providing server outputs the scrollbar on the web page screen containing the contents scrolled until the time point of sensing the end of the flick S810. At this point, a flick animation is performed as the flick is sensed when the high-speed scroll is performed, and the scrollbar is output at the final position when the flick animation is finished.

FIG. 14 is a flowchart illustrating a web page scrollbar display method according to a second embodiment of the present invention.

Referring to FIG. 14, if movement of a touched state on the web page screen including a scrollbar is sensed at the user terminal 150, the web page providing server 150 according to the present invention receives a touch movement sensing signal S902.

Accordingly, the web page providing server performs a contents scroll according to a contents update speed S904, in correspondence to a moving direction of the touch movement sensing signal, and adjusts a scrollbar update speed so as to update the scrollbar at a speed lower than a contents update speed S906. For example, the web page providing server may adjust the contents update speed to 60 fps and the scrollbar update speed to 10 fps.

In addition, the web page providing server creates a scrollbar according to the adjusted scrollbar update speed S908 and outputs the scrollbar on the web page screen S910.

At this point, the web page providing server may output the scrollbar by jumping by the unit of a step according to the adjusted scrollbar update speed.

Meanwhile, according to still another aspect of the present invention, a web page scrollbar display method in a web page providing server may be recorded as a program in a recording medium that can be read by an electronic apparatus, the method including the steps of: receiving, if movement of a touched state on a web page screen including a scrollbar is sensed at a user terminal 150, a touch movement sensing signal; performing a contents scroll in correspondence to a moving direction of the touch movement sensing signal and receiving, if touch separation is sensed for the movement of the touched state, a touch separation sensing signal; hiding the scrollbar from the web page screen at a moment of receiving the touch separation sensing signal; performing a high-speed scroll on contents in a flicking direction of a sensed flick at the user terminal 150; and outputting, if an end of the flick is sensed, the scrollbar on the web page screen containing the contents scrolled until the time point of sensing the end of the flick.

On the other hand, according to still another aspect of the present invention, a web page scrollbar display method in a web page providing server may be recorded as a program in a recording medium that can be read by an electronic apparatus, the method including the steps of: receiving, if movement of a touched state on a web page screen including a scrollbar is sensed at a user terminal 150, a touch movement sensing signal; performing a contents scroll according to a contents update speed, in correspondence to a moving direction of the touch movement sensing signal; adjusting a scrollbar update speed to update the scrollbar at a speed lower than the contents update speed; and outputting a scrollbar created according to the adjusted scrollbar update speed on the web page screen.

The web page scrollbar display method can be created as a program in the web page providing server, and codes and code segments configuring the program may be easily inferred by programmers in the art. In addition, the program related to the web page scrollbar display method in the web page providing server may be stored in an information storage medium (a readable medium) that can be read by an electronic apparatus and read and executed by the electronic apparatus.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention may be applied to a user terminal or a web document providing apparatus which distinguishes a high-speed scroll from a general scroll in an operation of a user's finger or a mouse for performing a general scroll on web page contents.

In addition, the present invention may be applied to a high-speed scroll contents display method and system, in which when web page contents are scrolled at a high speed, details of the contents can be confirmed even while multiple pages are moved on a screen, by repeating an operation of dividing the screen, moving the divided screens at the same time, showing a standstill screen as long as a user may recognize the contents, and moving again to a next screen.

In addition, the present invention may be used to provide a web page scrollbar display system and method for smoothly performing a contents scroll at a mobile terminal having restricted performance by reducing the load of outputting a scrollbar, which is accomplished by performing, if movement of a touched state on a web page screen including a scrollbar is sensed at the user terminal, the contents scroll in correspondence to a sensed moving direction, hiding, if touch separation is sensed for the movement of the touched state, the scrollbar at the moment of sensing the touch separation, and outputting, if an end of a flick is sensed while a high-speed scroll is performed on the contents in a flicking direction of the sensed flick, the scrollbar on the web page screen containing the contents scrolled until the time point of sensing the end of the flick.

The invention claimed is:

1. A user terminal, comprising:
  a communication unit configured to receive a web document created in a web description language from a web document providing apparatus;
  a display configured to display the received web document as a web page screen on a mobile browser or an output result of a web application process;
  an input unit configured to sense a touch movement on the web page screen;
a video output memory configured to record and read information to be output on the display;
  a memory configured to store data including an intermediate operation result according to a process of the web application process; and
  a processor configured to
  perform, when movement of a touched state on the web page screen is sensed, a contents scroll in correspondence to a sensed moving direction, and
  repeat, when a high-speed scroll is performed on contents in a flicking direction of a sensed flick, an operation of dividing a contents screen, moving the divided contents screens at a same time, automatically stopping movement of the divided screen for the predetermined time period and without user input, and moving again to a next divided contents screen when the predetermined time period is elapsed, until an end of the sensed flick is sensed,
  wherein the processor is configured to repeat an operation of performing the high-speed scroll on the contents while reducing a speed of scroll in the flicking direction of the sensed flick, stopping movement of the screen for the predetermined time period, and moving again the screen while reducing the speed of scroll when the predetermined time period is elapsed, until the end of the sensed flick is sensed.

2. A web document providing apparatus, comprising:
  a communication unit configured to communicate with a user terminal; and a processor configured to
  provide the user terminal with contents,
  receive, from the user terminal, a touch movement sensing signal according to sensing movement of a touched state on a web page screen of the contents, a touch separation sensing signal according to sensing separation for the movement of the touched state, and a flick sensing signal according to sensing a flick,
  perform a contents scroll in correspondence to a moving direction of the touch movement sensing signal and a high-speed scroll on the contents in correspondence to a flicking direction of the flick sensing signal; and
  perform, when movement of a touched state on the web page screen is sensed from the user terminal, a contents scroll in correspondence to the sensed moving direction, and
  repeat, when the high-speed scroll is performed on the contents in the flicking direction of the sensed flick, an operation of dividing a contents screen, moving the divided contents screens at a same time, automatically stopping movement of the divided screen for the predetermined time period and without user input, and moving again to a next divided contents screen when the predetermined time period is elapsed, until an end of the sensed flick is sensed, and
  wherein the processor is configured to repeat an operation of performing the high-speed scroll on the contents while reducing a speed of scroll in the flicking direction of the sensed flick, stopping movement of the screen for a predetermined time period, and moving again the screen while reducing the speed of scroll when the predetermined time period is elapsed, until the end of the sensed flick is sensed.

3. A high-speed scroll contents display method of a user terminal, the method comprising:
  receiving a web document created in a web description language from a web document providing apparatus;
  displaying the received web document as a web page screen on a mobile browser according to a web application process;
  sensing a moving direction of the touched state on the web page screen;
  performing a contents scroll in correspondence to the sensed moving direction, and a high-speed scroll on a contents screen in a flicking direction of a sensed flick; and
  repeating an operation of dividing the contents screen, moving the divided contents screens at a same time, automatically stopping movement of the divided contents screens for a predetermined time period and without user input, and moving again to a next divided contents screen when the predetermined time period is elapsed, until an end of the sensed flick is sensed,
  wherein the repeating an operation repeats an operation of performing the high-speed scroll while reducing a speed of scroll according to an ease function, stopping the movement of the divided contents screens for the predetermined time period, and moving again the screen while reducing the speed of scroll when the predetermined time period is elapsed, until the end of the sensed flick is sensed.

4. A high-speed scroll contents display method of a web document providing apparatus, the method comprising:
  providing a user terminal with contents;
  sensing movement of a touched state on a web page screen of the contents from the user terminal;
  performing a contents scroll in correspondence to a sensed moving direction, and a high-speed scroll on a contents screen in a flicking direction of a sensed flick; and
  repeating an operation of dividing the contents screen, moving the divided contents screens at a same time, automatically stopping movement of the divided contents screens for a predetermined time period and without user input, and moving again to a next divided contents screen when the predetermined time period is elapsed, until an end of the sensed flick is sensed,
  wherein the repeating an operation repeats an operation of performing the high-speed scroll while reducing a speed of scroll according to an ease function, stopping the movement of the divided contents screens for the predetermined time period, and moving again the divided contents screens while reducing the speed of scroll when the predetermined time period is elapsed, until the end of the flick is sensed.

\* \* \* \* \*